(12) United States Patent
Jun

(10) Patent No.: US 9,239,089 B2
(45) Date of Patent: Jan. 19, 2016

(54) GREASE SHUT-OFF GAS CYLINDER

(71) Applicant: KOREA GAS SPRING CO., LTD., Incheon (KR)

(72) Inventor: Young Sang Jun, Gyeonggi-do (KR)

(73) Assignee: KOREA GAS SPRING CO., LTD., Incheon (KR)

( * ) Notice: Subject to any disclaimer, the term of this patent is extended or adjusted under 35 U.S.C. 154(b) by 1 day.

(21) Appl. No.: 14/280,717

(22) Filed: May 19, 2014

(65) Prior Publication Data

US 2014/0374973 A1    Dec. 25, 2014

(30) Foreign Application Priority Data

Jun. 25, 2013   (KR) .................. 10-2013-0073024

(51) Int. Cl.
| | |
|---|---|
| *F16F 9/02* | (2006.01) |
| *A47C 3/30* | (2006.01) |
| *F16F 9/56* | (2006.01) |

(52) U.S. Cl.
CPC ............... *F16F 9/0245* (2013.01); *A47C 3/30* (2013.01); *F16F 9/0263* (2013.01); *F16F 9/56* (2013.01)

(58) Field of Classification Search
CPC ..... F16F 9/0209; F16F 9/0218; F16F 9/0281; F16F 9/0245; F16F 9/0263; F16F 9/56
USPC .................... 188/64.26; 267/64.26
See application file for complete search history.

(56) References Cited

U.S. PATENT DOCUMENTS

| | | | | |
|---|---|---|---|---|
| 2,336,137 | A | * | 12/1943 | Thornhill .................. 267/64.26 |
| 5,511,759 | A | * | 4/1996 | DeKraker et al. ............. 248/575 |
| 6,182,806 | B1 | * | 2/2001 | Hasegawa .................. 267/64.26 |
| 6,474,619 | B1 | * | 11/2002 | Ma ............................. 248/631 |
| 2004/0124570 | A1 | * | 7/2004 | Huh et al. .................. 267/64.12 |
| 2004/0245831 | A1 | | 12/2004 | Jeon |
| 2005/0194727 | A1 | * | 9/2005 | Chung ....................... 267/64.11 |
| 2006/0091591 | A1 | * | 5/2006 | Robertson .................. 267/64.26 |
| 2007/0262501 | A1 | * | 11/2007 | Cheever et al. ............ 267/64.11 |
| 2011/0037208 | A1 | * | 2/2011 | Jun ............................. 267/114 |

FOREIGN PATENT DOCUMENTS

| | | | |
|---|---|---|---|
| DE | 8601132 | U1 | 2/1986 |
| KR | 10-2004-0034385 | A | 4/2004 |
| KR | 10-0786818 | B1 | 12/2007 |
| KR | 10-1233097 | B1 | 2/2013 |

* cited by examiner

Primary Examiner — Thomas J Williams
(74) Attorney, Agent, or Firm — Rabin & Berdo, P.C.

(57) ABSTRACT

A grease shut-off gas cylinder comprises an outer cylinder having a guide hole; a spindle inserted in the guide hole and having an inner pipe and an outer pipe; a piston rod having a piston wherein the bottom of a rod is fixed on a bottom surface of the outer cylinder and the top of the rod is slide-inserted in the inner pipe; a valve body secured to top of the spindle and controlling the spindle to move up or down about the piston on the basis of the operations of a valve pin which controls the moving direction of gas; a bushing member protruding from an outer side of the bottom of the spindle and coming into slide contact with an inner wall of the outer cylinder; and a bushing cap secured to top of the outer cylinder and having a guide hole configured to guide the spindle.

3 Claims, 10 Drawing Sheets

GREASE SHUT-OFF GAS CYLINDER

TECHNICAL FIELD

The present invention relates to a grease shut-off gas cylinder which is installed to adjust the height of a chair or the like, and in particular to a grease shut-off gas cylinder which makes it possible to prevent a problem that grease inputted into an outer cylinder gets on an outer surface of a spindle and leaks to the outside of the outer cylinder when the spindle configured to rotate, ascend or descend a sitting part of a chair repeatedly ascends or descends.

BACKGROUND ART

A gas cylinder is generally adapted to a height ascending and descending structure of a sitting part of a chair on which a user sits, so a user can selectively ascend or descend the sitting part using a gas pressure.

The conventional gas cylinder is often called a gas spring and as shown in FIG. 1, comprises a hollow outer cylinder 10 vertically installed on a base provided on the ground, a bushing member 20 which is secured to an inner upper portion of the outer cylinder 10, a spindle 30 which slides and is inserted in the upward and downward directions at an inner side of the bushing member 20 and forms a gas flow path and is equipped with inner and outer pipes 32 and 34, a piston 40 which slides in the interior of the inner pipe 32 and ascends or descends the spindle 30 on the basis of gas pressure, a rod 50 which is fixedly secured to the center of the bottom of the piston 40 and the bottom of which is fixedly secured to the bottom of the outer cylinder 10, a valve body 60 which is secured to top of the spindle 30 and controls the spindle 30 to ascend or descend on the basis of the operations of a valve pin which controls the flowing direction of gas, and a lever which drives the valve pin 62.

The above described gas cylinder operates on the basis of the flow of gas. The gas in the upper and lower spaces formed about the piston 40 moves via the gas flow path formed between the vale body 60 and the inner pipe 32 and the outer pipe 34 on the basis of the operation of the valve pin disposed in the valve body 60, for thereby ascending or descending the spindle 30.

The above described gas cylinder is mainly adapted to a chair in a known way. When a user operates the operation lever, the spindle 30 comes to ascend or descend on the basis of the support of the rod 50, thus ascending or descending the sitting part.

However, in case of the above described gas cylinder, when the sitting part of the chair ascends, the spindle 30 slides along the inner wall of the bushing member 20, which makes the outer surface expose to the outside. At this time, liquid lubricant such as grease coated on the inner surfaces gets on the surface of the spindle 30, which liquid lubricant is provided for smooth sliding operation.

Since liquid lubricant such as grease is supplied from the outside for the sake of continuous sliding operations of the spindle, when the liquid lubricant gets on a predetermined thing or a user's hand, the exterior of the thing stained with the liquid lubricant looks bad.

In order to improve the above described problems, the applicant of the present invention filed a grease leakage prevention gas cylinder whose Korean patent number is 10-1233097.

In the above mentioned grease leakage prevention gas cylinder, there are included a bushing member which is secured to an inner upper portion of the outer cylinder, a cylinder which slides up and down in the interior of the bushing member and is equipped with an inner pipe and an outer pipe, a piston which is positioned somewhere in the inner pipe where it can slide and ascends or descends the spindle on the basis of gas pressure, a rod whose top is fixedly secured to the center of the bottom of the piston and whose bottom is fixedly secured to the bottom of the outer cylinder, a valve body which is secured to top of the spindle and controls the spindle to operate up or down on the basis of the operation of a valve pin which controls the moving direction of the gas, and a lever which activates the valve pin, in which construction a cover is secured to top of the bushing member for the sake of covering the bushing member, and a guide groove is formed in an inner circumferential surface of the cover along its surrounding, and a packing coming into contact with an outer surface of the spindle is engaged to the guide groove.

In the above described invention, the outer surface of the spindle which extends from the bushing member of the outer cylinder when it is applied to a chair or the like and allows the sitting part to ascend or descend is not exposed to the outside, so liquid lubricant such as grease does not leak outside with the aid of packing, thus obtaining good-looking exterior and cleanness.

In the above described structure, since the spindle reciprocates in upward and downward directions while it slides along the bushing member, the grease which leaks outside as it gets on the spindle is collected by the bushing member when the spindle descends, so the grease increases on top of the bushing member.

PRIOR ART DOCUMENT

Patent Document (Patent Document 0001) Korean Patent No. 10-1233097 Grease Leakage Prevention Gas Cylinder

DISCLOSURE OF INVENTION

Accordingly, the present invention is made in consideration of the above mentioned problems.

The objects of the present invention are as follows.

First, it is an object of the present invention to maintain clean the exterior of the spindle which serves to ascend or descend the sitting part of a chair or the like.

Second, it is another object of the present invention to integrate a bushing member into the bottom of the spindle and to make the bushing member slide along the inner wall of the outer cylinder for thereby preventing impurity from getting on the spindle and leaking outside.

Third, it is further object of the present invention to secure a bushing member to the spindle and to secure a bushing to the outer cylinder, thus preventing grease from leaking outside due to the sliding operations of the bushing member and the bushing.

To achieve the above objects,

There is provided a grease shut-off gas cylinder, comprising an outer cylinder which has a guide hole; a spindle which is inserted in the guide hole from top to bottom and has an inner pipe and an outer pipe formed at an inner wall to form a flow path; a piston rod which has a piston wherein the bottom of a rod is fixed on a bottom surface of the outer cylinder, and the top of the rod is slide-inserted in the inner pipe; a valve body which is secured to top of the spindle and controls the spindle to move up or down about the piston on the basis of the operations of a valve pin which controls the moving direction of gas; a bushing member which protrudes from an outer side of the bottom of the spindle and comes into slide contact with an inner wall of the outer cylinder; and a bushing cap which is secured to top of the outer cylinder and has a guide hole configured to guide the spindle.

The bushing member is integrally provided at an outer side of the spindle.

The bushing member is inserted between the inner wall of the outer cylinder and the outer side of the spindle to define a pipe shape.

The bushing cap is equipped with a reinforcing part which is provided at the bottom to surround and support an outer side of top of the outer cylinder.

In addition, to an outer side of the reinforcing part is secured a can pipe whose top supports the reinforcing part and whose bottom extends downward, and the end portion is fixed to an outer side of the outer cylinder.

To an outer side of the outer cylinder is further secured a pipe-shaped reinforcing pipe.

Advantageous Effects

In the present invention, a gas cylinder is adapted to a chair with a sitting part. Grease is applied to the bushing member disposed at the bottom of the spindle and is applied to the inner wall of the outer cylinder. When the spindle ascends or descends, the bushing member slides along the inner wall of the outer cylinder, so the grease does not get on the outer surface of the spindle, thus obtaining good-looking exterior and cleanness.

Since the bushing cap is equipped on top of the outer cylinder, good-looking exterior and cleanness of the spindle can be obtained.

BEST MODES FOR CARRYING OUT THE INVENTION

The preferred embodiments of the present invention will be described in details with reference to the accompanying drawings. If the related known art is judged to make unclear the subject matter of the present invention in the course of description, its description will be omitted.

The present invention is directed to a gas cylinder wherein liquid lubricant such as grease does not get on the outer surface of the spindle adapted to adjust the height of a sitting part of a chair or the like and does not leak outside.

<First Embodiment>

Figure 1:
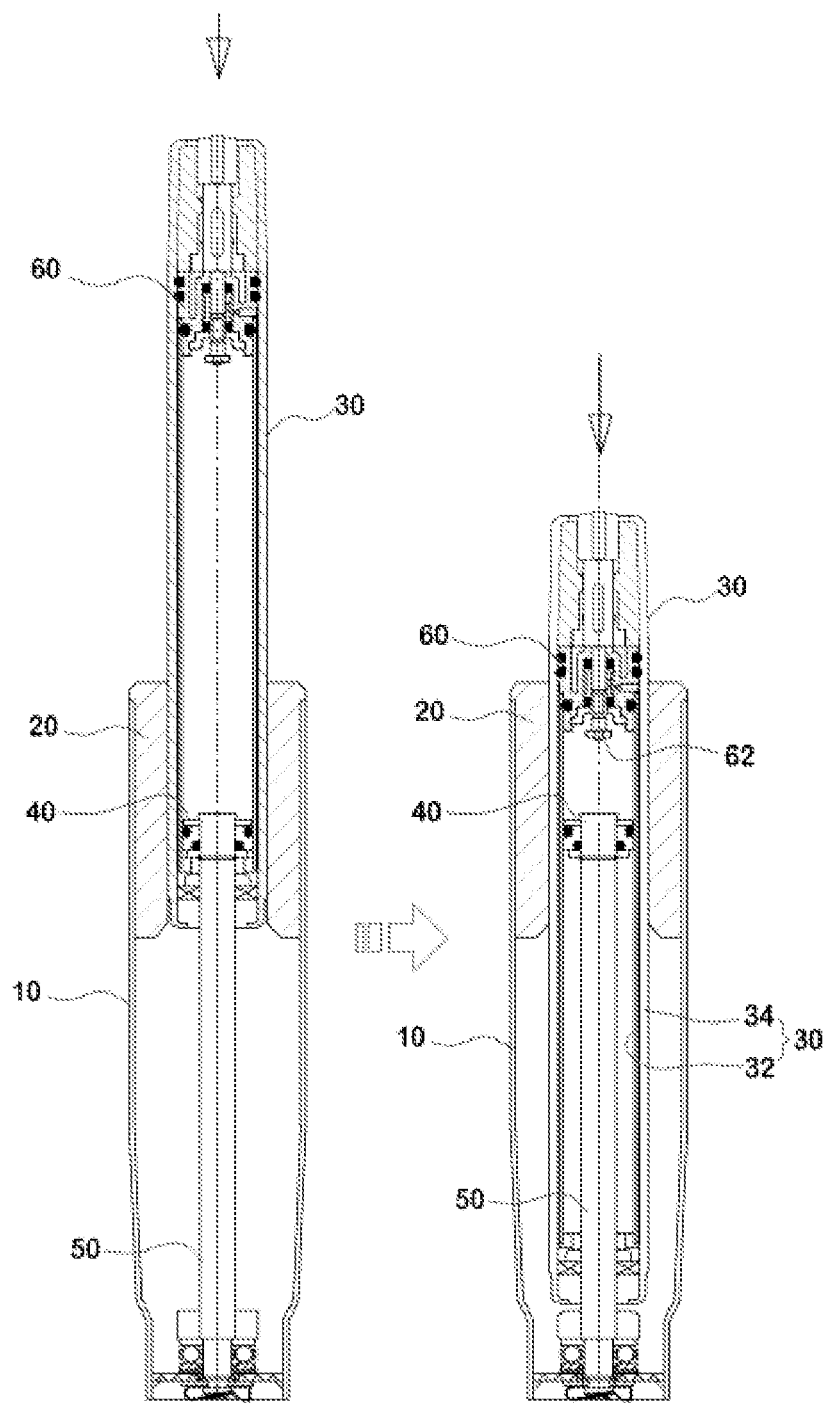
FIG. 1 is a vertical cross-sectional view illustrating a use state of a conventional gas cylinder.
Figure 2:
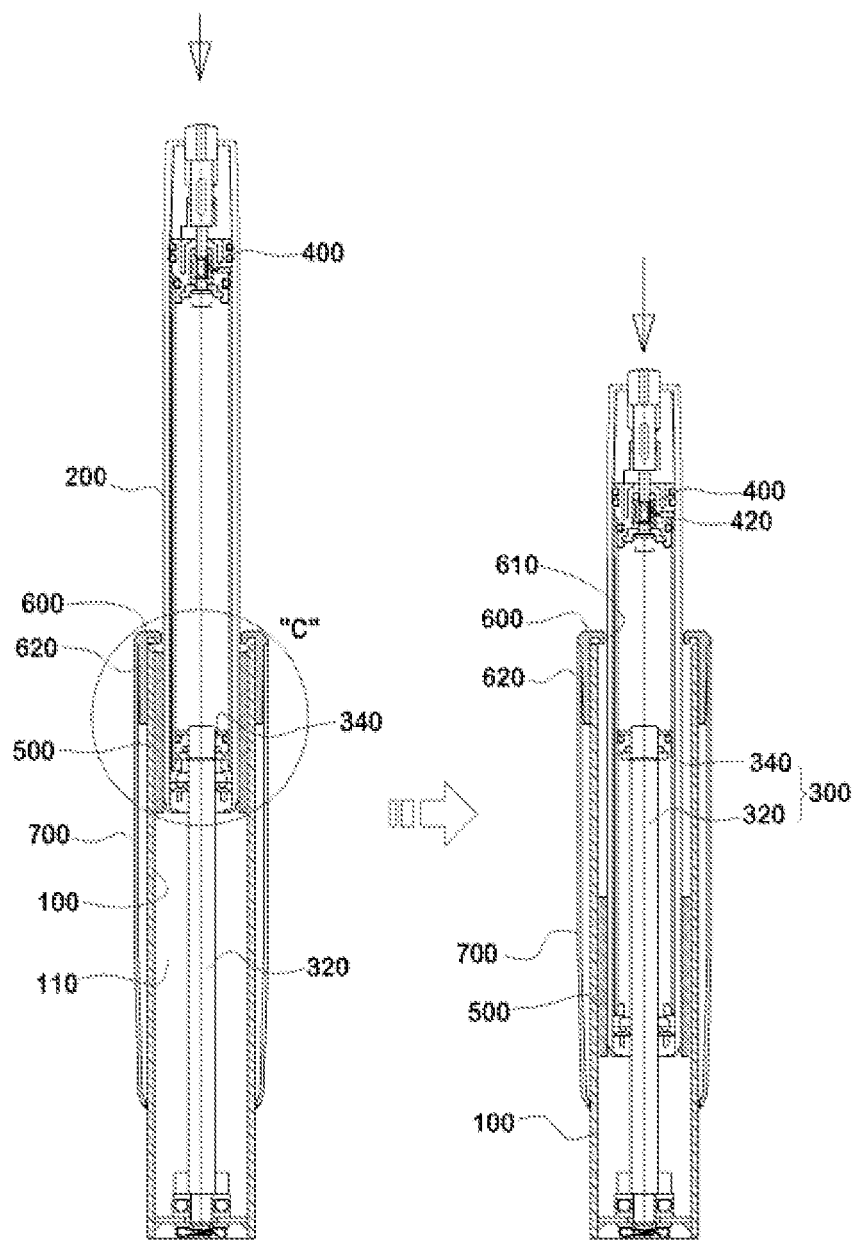
FIG. 2 is a vertical cross-sectional view illustrating a use state of a grease shut-off gas cylinder according to the present invention.
Figure 3:
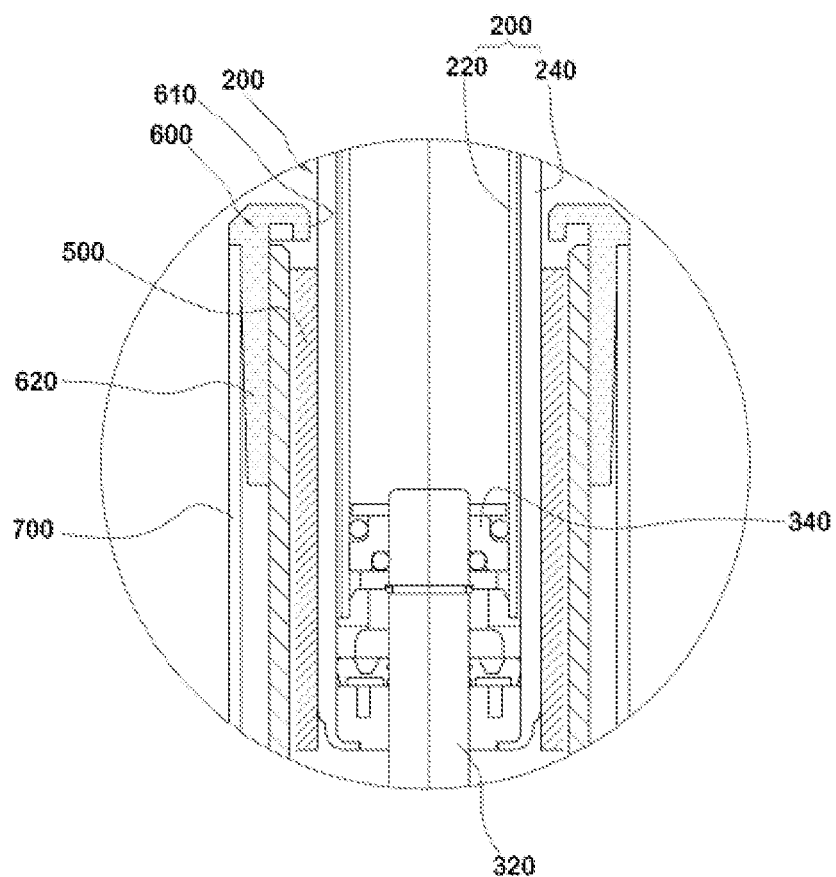
FIG. 3 is an enlarged view of the portion "C" of FIG. 2.

As show in FIGS. 2 and 3, in the present invention, there are included an outer cylinder 100, a spindle 200 which is inserted in the outer cylinder 100 and ascends or descends, a piston rod 300 which is secured to the outer cylinder 100 and ascends or descends the spindle 200, a valve body 400 which changes the flow path of air, a bushing member 500 which is secured to the spindle 200 and slides along the outer cylinder 100, and a bushing cap 600 which is secured to top of the outer cylinder 100 and has a guide hole 610 guiding the spindle 200.

The outer cylinder 100 has a guide hole 110 which passes through its center from top to bottom as in the known art.

The spindle 200 comprises an inner pipe 220 and an outer pipe 240 which are inserted in the guide hole 110 and have gas flow paths formed along their inner walls.

The piston rod 300 includes a piston 340 and a rod 320, wherein the lower end of the rod 320 is fixed on the inner bottom surface of the outer cylinder 100, and the piston 340 is secured to top of the rod 320. The piston 340 slides and is inserted in the inner pipe 220 of the spindle as in the known art.

The valve body 400, as in the known art, is secured to top of the spindle 200 and controls the spindle 200 to operate in an upward or downward direction about the piston 340 on the basis of the operations of the valve pin 420 which controls the moving direction of gas.

The valve pin 420, as not shown in the drawing, controls the gas flow path of the valve body 400 in accordance with the upward and downward operations of the lever.

The bushing member 500, as a key component of the present invention, is secured to the outer side of the spindle 200 and comes into contact with the inner wall of the outer cylinder 100 and serves to prevent grease from leaking outside wherein the grease is supplied thereto for the sake of sliding operations when the spindle 200 moves upward or downward.

Figure 4:
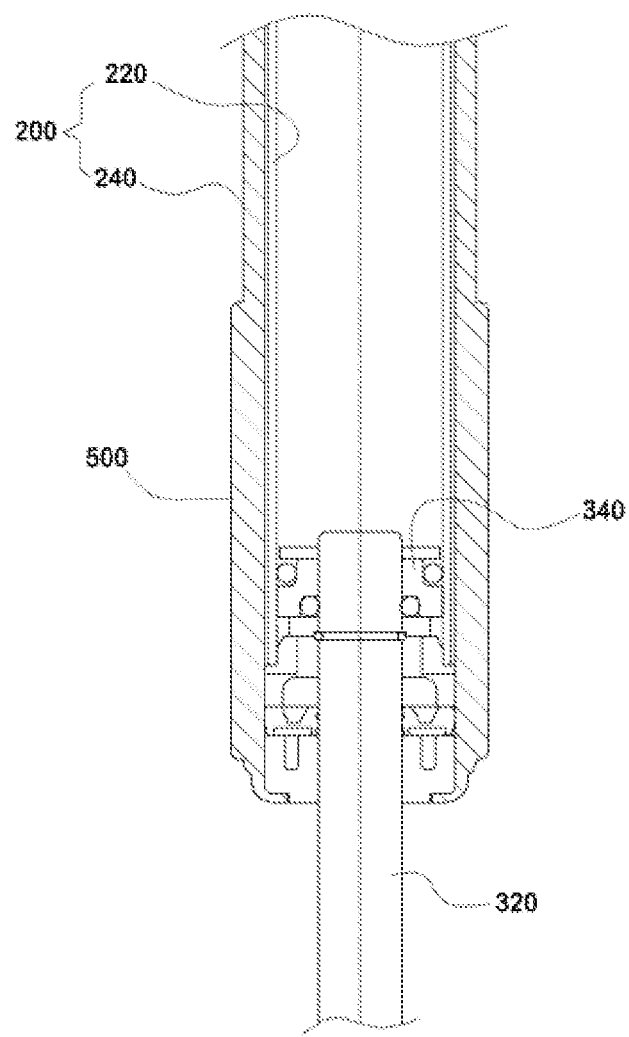
FIG. 4 is a vertical cross-sectional view illustrating a bushing member of FIGS. 2 and 3.
Figure 5:
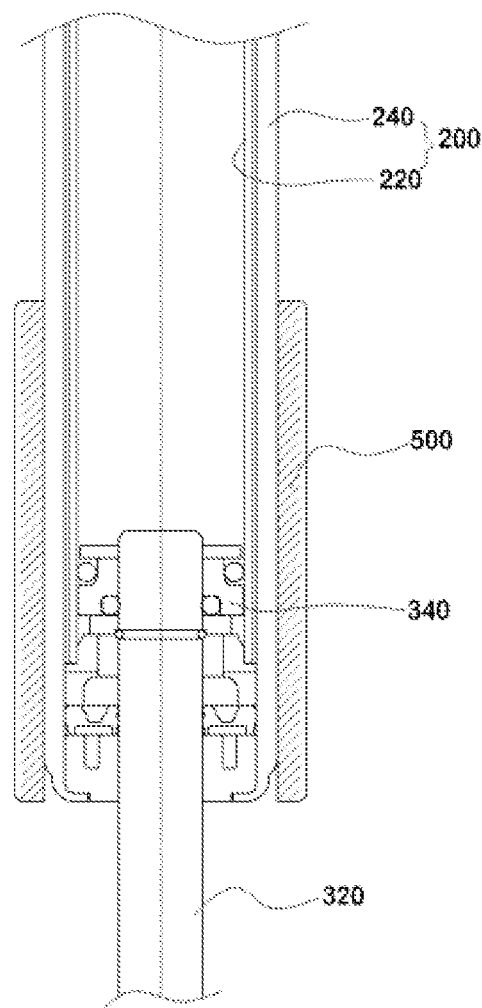
FIG. 5 is a view for explaining another example of a bushing member of FIG. 4.
Figure 6:
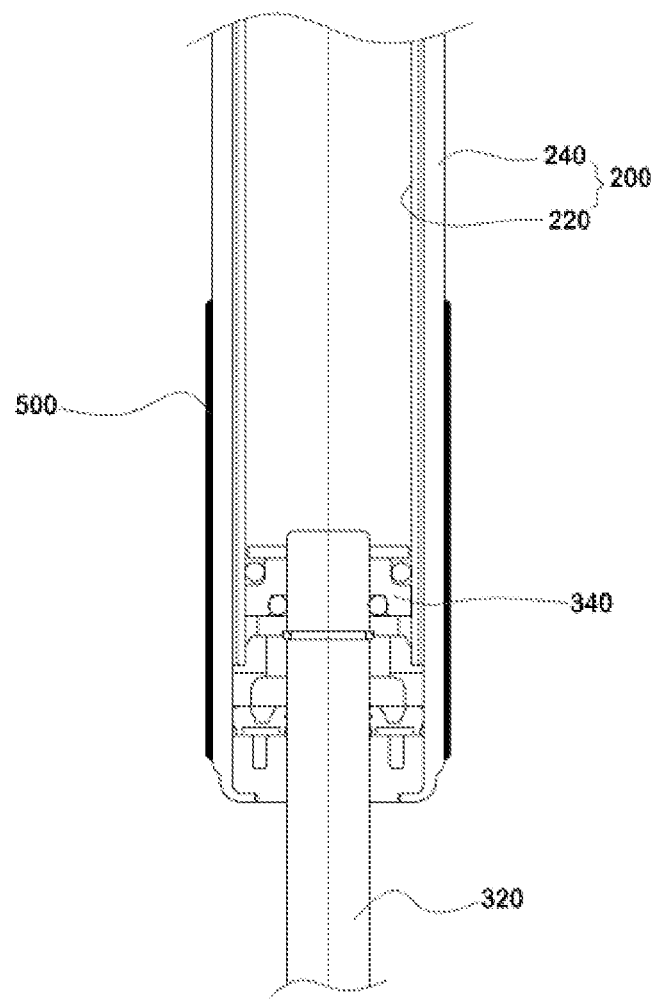
FIG. 6 is a view for explaining further another example of a bushing member of FIG. 4.

Here, it is obvious that the bushing member 500 may be secured to the spindle 200 in some ways. As shown in FIG. 4, it may be integrally provided at an outer side of the spindle 200 when the spindle 200 is manufactured, and as shown in FIG. 5, it may be manufactured in a pipe shape and is inserted in the spindle 200 and is secured by a welding method and may be configured to protrude with the use of coating agent on the basis of liquid application as shown in FIG. 6.

As shown in FIG. 3, the bushing cap 600 is made from a metal and a synthetic material and is secured to top of the outer cylinder 100 and includes a guide hole 610 which passes through its center from top to bottom for thereby guiding the spindle 200. In addition, on the bottom of the bushing cap 600 is formed a reinforcing part 620 which surrounds the outer surface of top of the outer cylinder 100 and supports the same.

The reinforcing part 620 is made from a metal and a synthetic material, and the inner wall of the reinforcing body 100 is secured in close contact with the inner wall or the outer wall of top of the outer body 100 for thereby supporting the shearing deformation of the outer cylinder 100.

Figure 7:
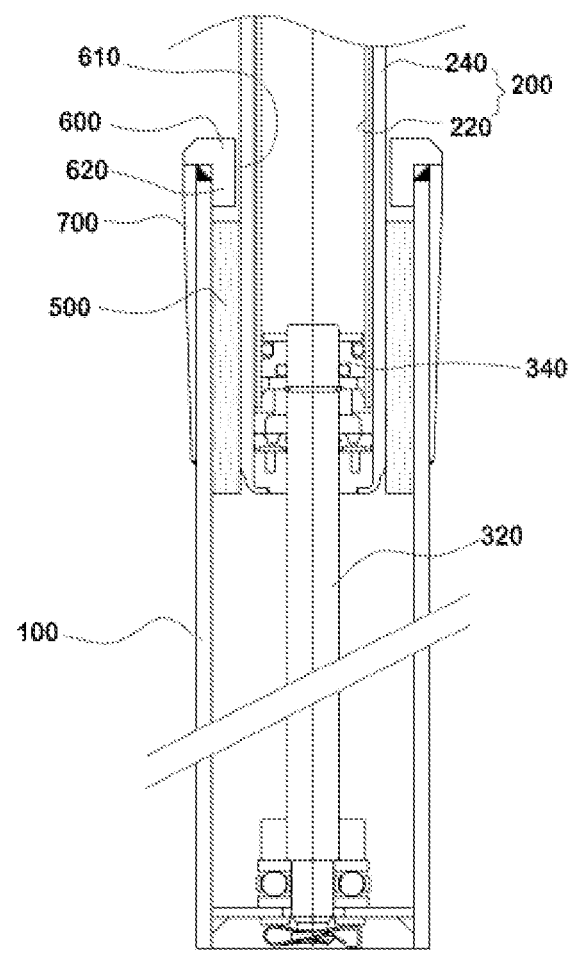
FIG. 7 is a vertical cross sectional view illustrating a relationship of engagement between the bushing member and the bushing cap of FIG. 2.

As shown in FIG. 7, at an outer side of the reinforcing part 620 is installed a can pipe 700 in order for the outer side of the reinforcing part 620 to have more stable support force. The can pipe 700 is secured in such a way that its top is supported surrounding the reinforcing part 620, and its bottom extends downward, and its end portion is fixedly secured to the outer side of the outer cylinder 100.

Figure 8:
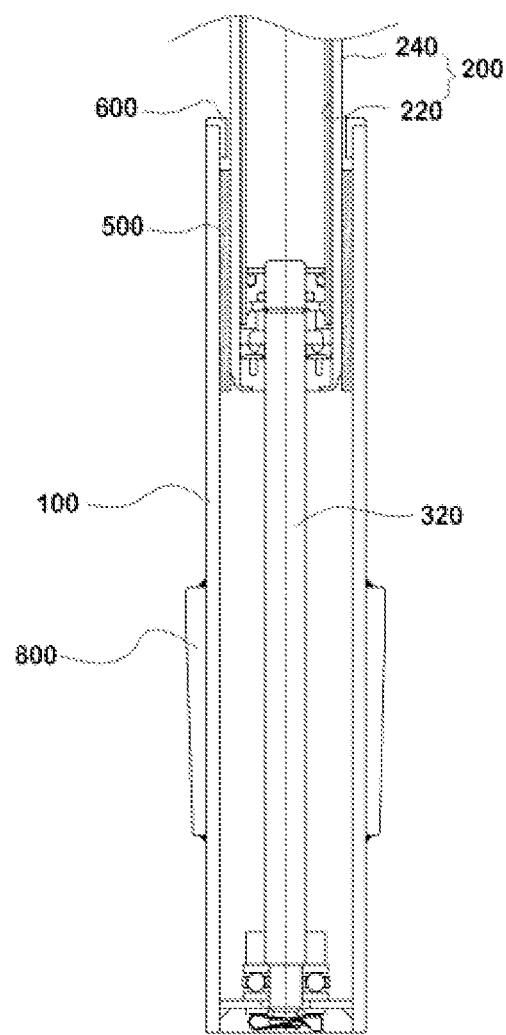
FIG. 8 is a view illustrating another example of FIG. 7.

As shown in FIG. 8, it is preferred that a pipe-shaped reinforcing pipe 800 may be further secured to the portion of the outer cylinder 100 where looks weak.

The thusly configured gas cylinder is assembled and installed in the sitting part of the chair.

When the sitting part ascends or descends, the bushing member 500 ascends or descends along the inner wall surface of the outer cylinder 100. At this time, grease is coated only in the section of the bushing member 500, more specifically, grease does not get on the spindle 200 which exposes to the outside.

<Second Embodiment>

Figure 9:
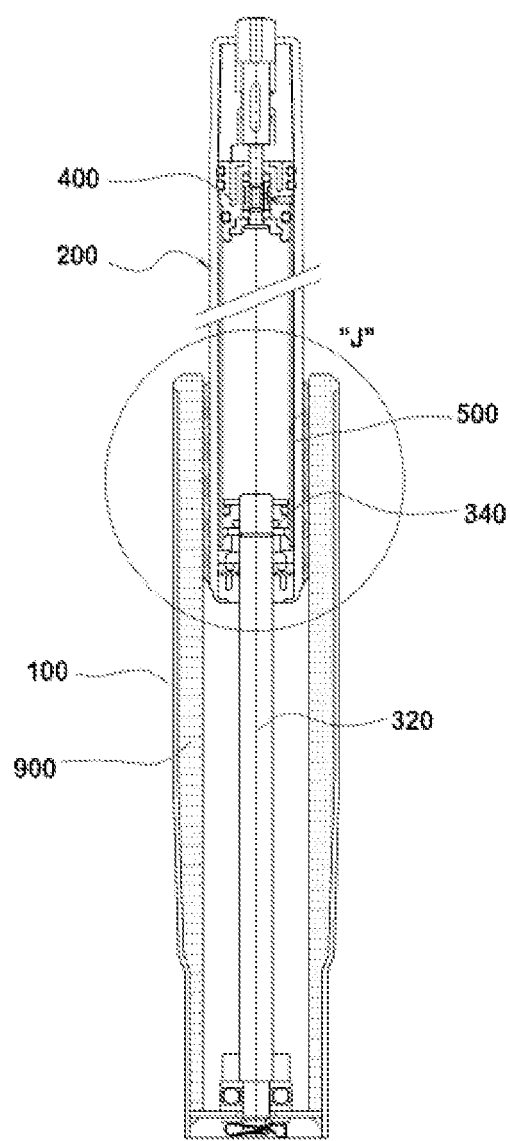
FIG. 9 is a view illustrating another embodiment of a grease shut-off gas cylinder according to the present invention.
Figure 10:
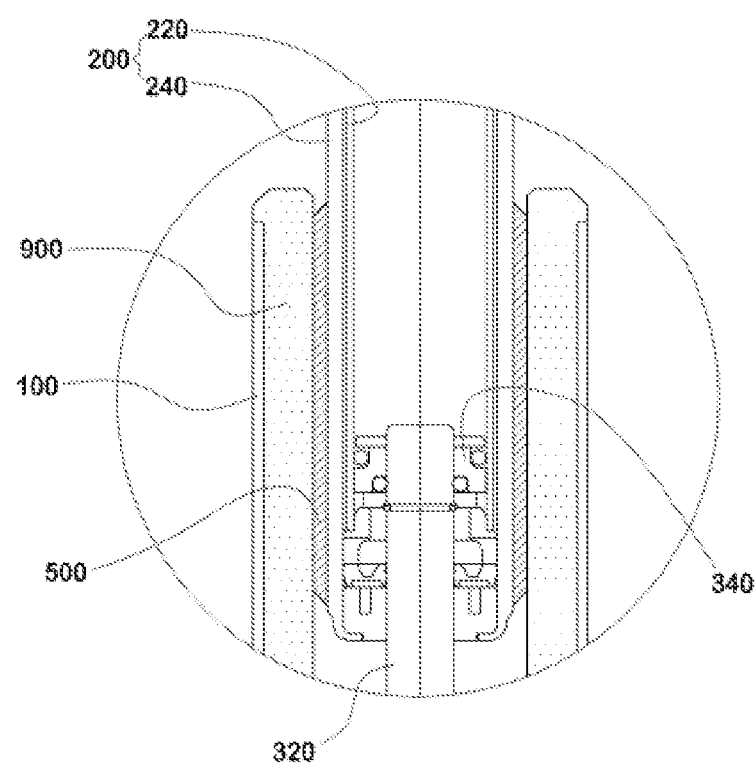
FIG. 10 is an enlarged view of the portion "J" of FIG. 9.

As shown in FIGS. 9 and 10, in the present invention, there are included an outer cylinder 100 which is equipped with a guide hole, a spindle 200 which is inserted in the guide hole and has an inner pipe 220 and an outer pipe 240 which define a gas flow path on an inner wall, a piston rod 300 which is equipped with a piston 340 wherein the bottom of the rod 320 is fixedly secured to the bottom surface of the outer cylinder 100, and the top of the rod 320 is slide-inserted in the inner pipe 220, a vale body 400 which is engaged to top of the spindle 200 and controls the spindle 200 to move up and down about the piston 340 on the basis of the operations of the valve pin which controls the moving directions of the gas, a bushing member 500 which is provided at the outer sides of the lever operating the valve pin and of the spindle and is secured in contact with the inner wall of the outer cylinder 100, and an outer cylinder bushing 900 which is secured to the inner wall of the outer cylinder 100 and whose inner wall comes into contact with the bushing member 500 of the spindle 200.

The outer cylinder bushing 900 is made from a synthetic resin material and is made in a hollow shape, wherein the outer surface of the outer cylinder bushing is integrally secured to the inner wall of the outer cylinder 100, and the bushing member 500 slides and ascends and descends along the inner wall.

The constructions of the outer cylinder 100, the spindle 200, the piston rod 300, the valve body 400 and the bushing member 500 have the same constructions and functions as the first embodiment, so the detailed descriptions thereon will be omitted.

In a state that grease is supplied to the inner wall of the outer bushing 900, when the spindle 200 continues to reciprocate up and down, the bushing member 500 secured to the spindle 200 slides and ascends and descends along the inner wall of the outer bushing 900, so the grease inputted for the sake of smooth friction does not get on the spindle 20 which exposes to the outside.

[Legend of Reference Numbers]

| | |
|---|---|
| 100: outer cylinder | 110: guide hole |
| 200: spindle | 220: inner pipe |
| 240: outer pipe | |
| 300: piston rod | 320: rod |
| 340: piston | |
| 400: valve body | |
| 500: bushing member | |
| 600: bushing cap | 610: guide hole |
| 620: reinforcing part | |
| 700: can pipe | |
| 800: reinforcing pipe | |
| 900: outer cylinder bushing | |

What is claimed is:

1. A grease shut-off gas cylinder, comprising:
an outer cylinder which has a first guide hole;
a spindle which is inserted in the first guide hole from top to bottom and has an inner pipe and an outer pipe formed at an inner wall to form a flow path;
a piston unit which has a piston and a rod, a bottom of the rod being fixed on a bottom surface of the outer cylinder, and a top of the rod being slide-inserted in the inner pipe;
a valve body which is secured to a top of the spindle and controls the spindle to move up or down about the piston on the basis of the operations of a valve pin which controls the moving direction of gas;
a bushing member which protrudes from an outer side of a bottom of the spindle and comes into slide contact with an inner wall of the outer cylinder;
a bushing cap which is secured to a top of the outer cylinder and has a second guide hole configured to guide the spindle, the bushing cap being equipped with a reinforcing part which is provided at a bottom of the bushing cap and comes into contact with an outer wall or an inner wall of the to of the outer cylinder, thereby preventing a shearing deformation, and
a can pipe secured to an outer side of the reinforcing part, a top of the can pipe supporting the reinforcing part, a bottom of the can pipe extending downward, and an end portion of the can pipe being fixed to an outer side of the outer cylinder.

2. The gas cylinder of claim 1, wherein the bushing member is integrally provided at an outer side of the spindle.

3. The gas cylinder of claim 1, further comprising a pipe-shaped reinforcing pipe secured to the outer side of the outer cylinder.

\* \* \* \* \*